March 30, 1965 B. O. KAPPELMANN 3,175,523

PRECISION PLANTER FOR PLASTIC SHEET PLANT ROWS

Filed July 2, 1962 2 Sheets-Sheet 1

INVENTOR.
BENJAMIN O. KAPPELMANN.
BY
Willard S. Grout
ATTORNEY

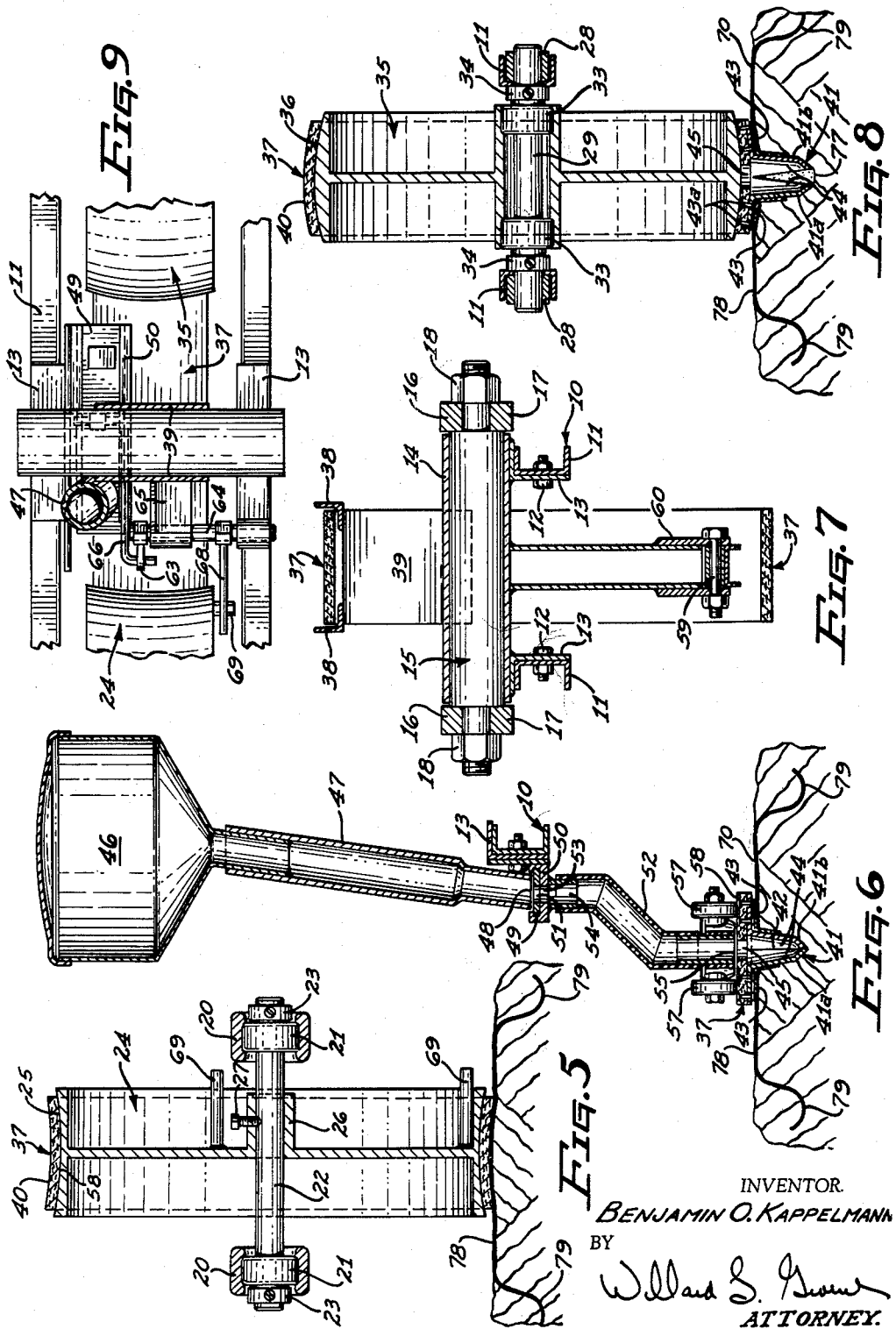

United States Patent Office 3,175,523
Patented Mar. 30, 1965

3,175,523
PRECISION PLANTER FOR PLASTIC SHEET PLANT ROWS
Benjamin O. Kappelmann, Phoenix, Ariz., assignor to Precision Agricultural Machinery Company, Phoenix, Ariz., a corporation of Arizona
Filed July 2, 1962, Ser. No. 207,114
6 Claims. (Cl. 111—89)

This invention pertains to seed planting apparatus and is particularly directed to a precision seed planter for accurately planting seed in a prepared plant row of a field.

One of the objects of this invention is to provide a precision seed planter for accurately planting seeds at longitudinally spaced intervals along a plant row of a field.

Another object of this invention is to provide a precision seed planter capable of injecting a seed below the ground level at accurately spaced intervals along the field plant row.

It is a further object to provide a precision planter that is particularly well adapted to plant seed through a plastic sheet stretched over the soil of the plant row at accurately spaced intervals along the plant row.

Still another object of this invention is to provide a precision planter capable of perforating and planting seed through a plastic sheet covered plant row in such manner that the planted seed in the ground are in exact register with the perforations in the plastic sheet with no stranded seed present under unperforated portions of the plastic sheet.

It is also an object to accomplish the above recited objectives with a precision seed planter operable over the crop row in a continuous automatic manner.

Another object is to provide a seed planter with an endless belt having a series of longitudinally split perforating and planting fingers projecting from the periphery thereof wherein the belt is carried on a pair of pulleys, one having a convex periphery and the other a concave periphery such that the operation of the belt over the pulleys effects the lateral opening and closing of said split fingers.

Further features and advantages of this invention will appear from a detailed description of the drawings in which:

FIG. 5 is an enlarged sectional view on the line 5—5 of FIG. 2;

FIG. 6 is an enlarged sectional view on the line 6—6 of FIG. 2;

FIG. 7 is an enlarged sectional view on the line 7—7 of FIG. 2;

FIG. 8 is an enlarged sectional view on the line 8—8 of FIG. 2;

FIG. 9 is an enlarged fragmentary sectional view on the line 9—9 of FIG. 3.

Figure 1:
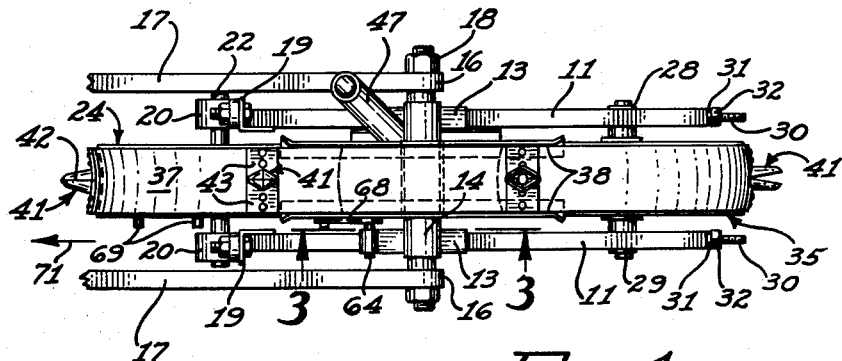
FIG. 1 is a top plan view of a precision seed planter incorporating the features of this invention.

As an example of one embodiment of this invention there is shown a precision seed planter comprising a frame 10 consisting of a pair of side rail channel members 11 which are fixed by suitable bolts 12 to the brackets 13 which are rigidly welded to the tubular support member 14. The tubular support member 14 is rotatably mounted on the rockshaft 15 carried in the outer ends 16 of the usual lifting and positioning levers 17 of a tractor, not shown. Suitable nuts 18 threaded on the ends of the rockshaft 15 demountably secure the described frame structure on the tractor arms 17.

On the front ends of the side rails 11 are fixed flanges 19 to which are secured the pillow blocks 20 containing anti-friction bearings 21 which support the concave pulley shaft 22 held against axial movement in the bearings 21 by suitable lock collars 23 on the ends of the shaft 22. A concave pulley 24 having the concave peripheral surface 25 has the integral hub 26 which is securely locked to the shaft 22 by a suitable set screw 27.

On the rearward portions of the side rails 11 are longitudinally slidably mounted the adjusting blocks 28 in which is fixed the convex pulley shaft 29. Suitable adjusting screws 30 are fixed to and extend rearwardly from the adjusting blocks 28 and pass through abutment plates 31 fixed to rear ends of the side rails 11. Appropriate jamb nuts 32 threaded on the adjusting screws 30 abut against the plates 31 to pull the convex pulley shaft 29 rearwardly of the side rails 11 to desired positions. Anti-friction bearings 33 are held against axial movement on the shaft 29 by suitable lock collars 34 and rotatably support the convex pulley 35 having the convex peripheral surface 36. A flat flexible belt 37 adapted to bend laterally operates over the concave surface 25 and the convex surface 36 of the pulleys 24 and 35 and by appropriately adjusting the nuts 32 proper tension is maintained in the belt 37 so that the belt conforms to the peripheries of the pulleys 24 and 35. The upper run 37a of the belt is preferably supported by suitable guide tracks 38 rigidly supported on the top edges of support plates 39 fixed to the tubular support member 14 for smooth operation and proper lateral positioning and tracking of the belt or the pulleys 24 and 35.

Projecting outwardly from the outer peripheral surface 40 of the belt 37 are the split planter fingers 41 each of which comprises a pair of laterally disposed segments 41a and 41b having a parting line 42 lying in a longitudinally disposed plane intermediate the sides of the belt and parallel to the direction of belt travel. Each segment 41a and 41b has a mounting flange 43 extending laterally away from the parting line 42 outwardly from the root of the planter finger segment which is securely riveted at 43a or otherwise secured to the outer peripheral surface 40 of the belt 37 so that lateral bending or flexing of the belt opens and closes the finger segments. Each of the segments 41a and 41b are hollowed out at 44 so as to form a seed compartment which communicates with an opening or seed passageway 45 formed in the belt 37.

A seed hopper 46 carried on the seed supply pipe 47 appropriately fixed to the frame 10 has a discharge opening 48 at its lower end over which slides the seed gate 49 slidably carried in a suitable guide piece 50 fixed to the frame 10. The seed gate 49 has a discharge port 51 which can be moved by sliding the gate 49 into or out of register with the discharge opening 48 of the seed supply pipe 47. A flexible seed discharge pipe 52 receives discharge from the port 51 of the seed gate 49 through the passageway 53 and pipe extension 54 of the guide piece 50. The lower discharge end 55 of the seed discharge pipe 52 is supported in alignment with the seed passageway 45 in the belt so that the passageways 45 successively pass under the discharge end 55 as the belt 37 operates over the pulleys 24 and 35. The lower discharge end of the seed discharge pipe 52 is carried on the outer end of an arm 56 having rollers 57 journaled thereon adapted to ride on the inside face 58 of the belt to maintain proper running clearance between the belt 37 and the discharge end 55 of the pipe 52. The arm 56 is pivotally mounted on a suitable pin 59 carried on the lower end of a bracket 60 fixed to the tubular support member 14 and a tension spring 61 is connected between the rear end 62 of the arm 56 and the bracket 60 to yieldingly maintain proper pressure of the rollers 57 against the inside surface 58 of the belt 37.

The seed gate 49 is actuated in timed relationship with the passage of the seed passageways 45 in the belt 37 under the discharge end 55 of the discharge pipe 52 by a lever arm 63 fixed on a rockshaft 64 pivotally mounted on a bracket 65 fixed to the tubular support member 14 and having its outer end pivotally connected to a link 66 in turn pivotally connected to a boss 67 fixed to the seed gate 49. A trip lever 68 is fixed on the rockshaft 64 and is adapted to be engaged by a series of circumferentially spaced trip pins 69 fixed adajacent the rim of the pulley 24.

Figure 2:
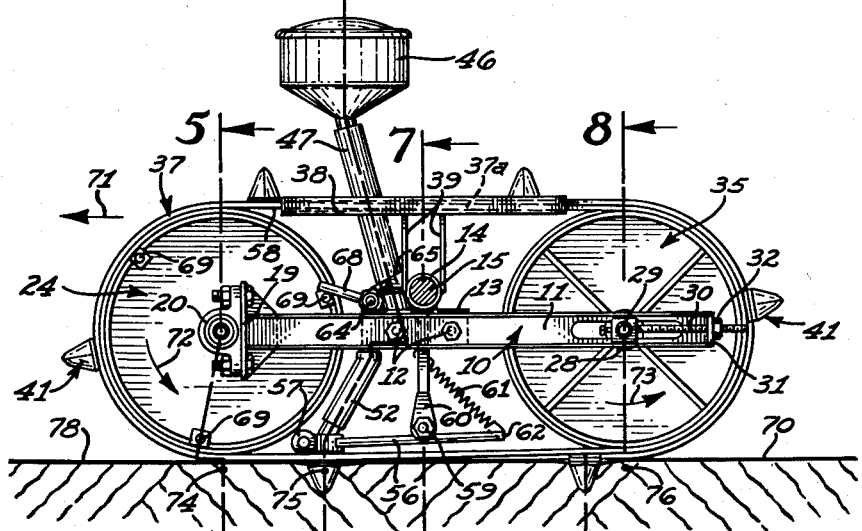
FIG. 2 is a left hand side elevation of the apparatus shown in FIG. 1.
Figure 3:
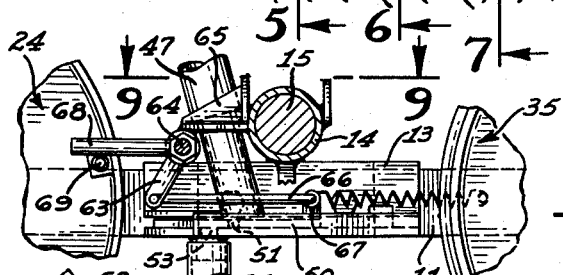
FIG. 3 is an enlarged fragmentary sectional view on the line 3—3 of FIG. 1, showing the seed feeding apparatus in closed position.
Figure 4:
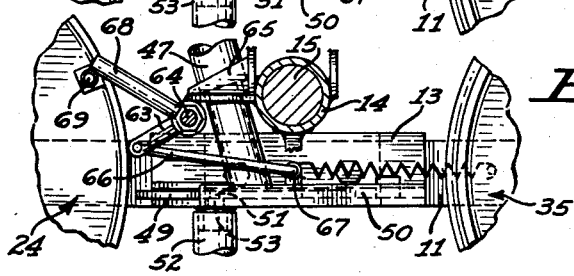
FIG. 4 is an enlarged fragmentary sectional view similar to FIG. 3 but showing the seed feeding apparatus in tripped feeding position.

In operation: the above described precision seed planter is placed on the ground surface of the plant row bed to be seeded, as best shown in FIG. 2. The unit is then moved along in the direction indicated by the arrow 71 by a suitable tractor so that the pulleys 24 and 35 rotate in the direction indicated by the arrows 72 and 73 with the lower portion of the belt in stationary contact with the ground 70 and the upper run 37a of the belt traveling in the direction of the arrow 71. As the belt 37 approaches and travels over the concave peripheral surface 25 of the pulley 24 the parting line 42 is held tightly closed as a planting finger 41 is rolled into the ground surface 70 at the point 74. As the unit travels the discharge end 55 of the seed discharge pipe 52 arrives over the seed passageway in the belt at the point 75 and the seed gate 49 has been properly tripped by a trip pin 69 on pulley 24 having actuated lever 68 to drop seed in the hollowed out portion 44 of the seed finger 41.

As the convex pulley 35 approaches and arrives over the injected seed finger 41 at the point 76 the finger opens laterally as shown in FIG. 8 allowing the seed to drop from the finger into the cavity 77 formed in the ground 70 by the finger. As the belt 37 moves upwardly over the pulley 35 the opened finger 41 is withdrawn from the ground cavity 77 in such a way as to leave therein the cavity and to cause soil from the side walls of the cavity to cave in and cover the seeds in the bottom of the cavity for proper growth. The belt and fingers then return along the upper run 37a to the pulley 24 to repeat the described cycle of operation. Because of the positive spacing of the fingers 41 along the belt a high precision of plant spacing results in the field seeded with this device.

This apparatus and method is particularly well adapted for planting seed through a plastic sheet 78 applied to a plant row. In this arrangement the plastic sheet 78 is stretched over the plant row surface 70 and held by the depressed ends 79 secured by the soil. The unit travels over the top of the plastic sheet planting the seed in the ground as described, the fingers 41 perforating the sheet and then withdrawing leaving the planted seed in exact register with the perforations formed in the sheet with no seed left abandoned under the sheet between the perforations. Thus a highly efficient planting operation through the plastic sheet is accomplished automatically with speed and precision.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A precision seed planter operable in contact with the ground surface of a field comprising in combination:
    (a) a frame,
    (b) a concave pulley journaled on said frame,
    (c) a convex pulley journaled on said frame,
    (d) a laterally flexible belt operating over said pulleys with its outer peripheral surface in contact with the ground surface so as to support said frame through said pulleys,
    (e) a series of longitudinally spaced planter fingers mounted on the outer peripheral surface of said belt pressed in and removed from the ground by the rolling of said pulleys within said belt while said belt is supported on the ground surface,
    (f) each of said planter fingers being split to form a pair of laterally disposed segments having a parting line intermediate the sides of and parallel to the direction of travel of said belt and having hollowed out seed compartments formed therein adjacent said parting line,
    (g) said planter fingers being mounted on the outer peripheral surface of said belt so that said parting line closes laterally when said belt approaches said concave pulley and opens laterally when said belt approaches said convex pulley.

2. A precision seed planter operable in contact with the ground surface of a field comprising in combination:
    (a) a frame,
    (b) a concave pulley journaled on said frame,
    (c) a convex pulley journaled on said frame,
    (d) a laterally flexible belt operating over said pulleys with its outer peripheral surface directly engaging the ground surface,
    (e) a series of longitudinally spaced planter fingers fixed to the outer peripheral surface of said belt entering and withdrawing from the ground surface as said pulleys roll on the inside of said belt in contact with the ground surface,
    (f) each of said planter fingers being split to form a pair of laterally disposed segments having a parting line in a plane intermediate the sides of and parallel to the direction of travel of said belt and hollowed out seed compartments formed therein adjacent said parting line,
    (g) said planter fingers being fixed to the outer peripheral surface of said belt so that said parting line is held laterally closed when said belt is traveling over said concave pulley and held laterally opened when said belt is traveling over said convex pulley,
    (h) and seed feeding means on said frame adapted to present seed into said seed compartments of said seed fingers as said belt relatively travels while in contact with the ground surface from said concave pulley to said convex pulley.

3. A precision seed planter operable in contact with the ground surface of a field comprising in combination:
    (a) a frame,
    (b) a concave pulley journaled on said frame,
    (c) a convex pulley journaled on said frame,
    (d) a laterally flexible belt operating over said pulleys with its outer peripheral surface of said belt in contact with the ground surface,
    (e) a series of longitudinally spaced planter fingers mounted on said outer peripheral surface of said belt adapted to be pressed in and withdrawn from the ground surface as said pulleys roll within said belt over the ground surface,
    (f) each of said planter fingers being split to form a pair of laterally disposed segments having a parting line intermediate the belt edges and parallel to the direction of travel of said belt and hollowed out seed compartments formed therein adjacent said parting line,
    (g) said planter fingers being fixed on said belt so that said parting line is closed when said belt is traveling over said concave pulley and opened when said belt is traveling over said convex pulley,
    (h) and seed feeding means on said frame adapted to supply seed through a passageway in said belt into said seed compartments of said seed fingers during the travel of said belt in contact with the ground surface from said concave pulley to said convex pulley.

4. A precision seed planter operable in contact with a ground surface of a field comprising in combination:
(a) a frame,
(b) a concave pulley journaled on the front end of said frame,
(c) a convex pulley journaled on the rear end of said frame,
(d) a flat laterally flexible belt operating over the peripheries of said pulleys with its outer peripheral surface of said belt in direct contact with the ground surface,
(e) a series of longitudinally spaced planter fingers fixed to the outer peripheral surface of said belt adapted to be pressed in and pulled out of said ground surface by the rolling of said pulleys inside of said belt over the ground surface each finger comprising,
(f) a pair of laterally positioned segments having,
(g) a parting line lying in a longitudinally disposed plane parallel to the direction of belt travel and,
(h) mounting flanges fixed to said belt and extending laterally away from said parting line plane outwardly from the root of said planter finger segments,
(i) means for securing said flanges to said belt,
(j) and hollowed out portions formed in each of said segments adjacent said parting line,
(k) a seed passageway formed through said belt in communication with said hollowed out portions of said seed finger segments,
(l) and seed feeding means fixed on said frame adapted to present seed through said seed passageways in said belt as said belt travels in contact with the ground surface from said concave pulley to said convex pulley.

5. A precision seed planter comprising in combination:
(a) a frame,
(b) a concave pulley journaled on the front end of said frame,
(c) a convex pulley journaled on the rear end of said frame,
(d) a flat laterally flexible belt operating over the peripheries of said pulleys,
(e) a series of longitudinally spaced planter fingers fixed to the outer peripheral surface of said belt, each finger comprising,
(f) a pair of laterally positioned segments having,
(g) a parting line lying in a longitudinally disposed plane parallel to the direction of belt travel and,
(h) mounting flanges extending laterally away from said parting line plane outwardly away from the root of said planter finger segments,
(i) means for securing said flanges to said belt,
(j) hollowed out portions formed in each of said segments adjacent said parting line,
(k) a seed passageway formed through said belt in communication with said hollowed out portions of said seed finger segments,
(l) seed feeding means on said frame adapted to present seed through said seed passageways in said belt as said belt travels from said concave pulley to said convex pulley,
(m) said seed feeding means including a seed hopper on said frame,
(n) a seed gate adapted to control the discharge of seed from said hopper,
(o) a seed discharge pipe connected to receive discharge from said seed gate and having a discharge end riding on the inside face of said belt and aligned with said seed passageways in said belt,
(p) and means on said frame for tripping said seed gate in timed relationship with the movement of said belt over said pulleys.

6. A precision seed planter comprising in combination:
(a) a frame,
(b) a concave pulley journaled on the front end of said frame,
(c) a convex pulley journaled on the rear end of said frame,
(d) a flat flexible belt operating over the peripheries of said pulleys,
(e) a series of longitudinally spaced planter fingers fixed to the outer peripheral surface of said belt, each finger comprising,
(f) a pair of laterally positioned segments having,
(g) a parting line lying in a longitudinally disposed plane parallel to the direction of belt travel and
(h) mounting flanges extending laterally away from said parting line plane outwardly away from the root of said planter finger segments,
(i) means for securing said flanges to said belt,
(j) hollowed out portions formed in each of said segments adjacent said parting line,
(k) a seed passageway formed through said belt in communication with said hollowed out portions of said seed finger segments,
(l) seed feeding means on said frame adapted to present seed through said seed passageways in said belt as said belt travels from said concave pulley to said convex pulley,
(m) said seed feeding means including a seed hopper on said frame,
(n) a seed gate adapted to control the discharge of seed from said hopper,
(o) a seed discharge pipe connected to receive discharge from said seed gate and having a discharge end riding on the inside face of said belt and aligned with said seed passageways in said belt,
(p) means on said frame for tripping said seed gate in timed relationship with the movement of said belt over said pulleys,
(q) said tripping means including a lever operable to actuate said seed gate to connect said hopper to said seed discharge pipe,
(r) and a series of circumferentially spaced trip pins on one of said pulleys to actuate said lever.

References Cited by the Examiner

UNITED STATES PATENTS

| | | | |
|---|---|---|---|
| 262,439 | 8/82 | Lindsay | 111—77 |
| 884,139 | 4/08 | Dyer | 111—3 |
| 1,304,321 | 5/19 | Julien | 275—2 |
| 2,503,828 | 4/50 | Loucks | 111—89 |
| 2,509,691 | 5/50 | McLemore | 111—19 X |

FOREIGN PATENTS

| | | |
|---|---|---|
| 500,972 | 2/51 | Belgium. |
| 1,036,553 | 4/53 | France. |
| 175,874 | 6/61 | Sweden. |

ABRAHAM G. STONE, *Primary Examiner.*
A. JOSEPH GOLDBERG, *Examiner.*